United States Patent [19]
Robinson

[11] Patent Number: 5,718,482
[45] Date of Patent: Feb. 17, 1998

[54] SIMPLIFIED LINEAR RECLINER

[75] Inventor: David L. Robinson, Sterling Heights, Mich.

[73] Assignee: Fisher Dynamics Corporation, St. Clair Shores, Mich.

[21] Appl. No.: 596,988

[22] Filed: Feb. 5, 1996

[51] Int. Cl.⁶ .................................................. B60N 2/02
[52] U.S. Cl. .............................. 297/367; 297/362.12
[58] Field of Search ...................... 297/361.1, 362.12, 297/366, 367, 463.1

[56] References Cited

U.S. PATENT DOCUMENTS

| | | |
|---|---|---|
| 3,133,764 | 5/1964 | Naef . |
| 4,245,866 | 1/1981 | Bell et al. . |
| 4,898,424 | 2/1990 | Bell . |
| 5,052,752 | 10/1991 | Robinson . |
| 5,265,936 | 11/1993 | Droulon et al. .................... 297/361.1 |

*Primary Examiner*—Milton Nelson, Jr.
*Attorney, Agent, or Firm*—Harness, Dickey & Pierce, P.L.C.

[57] ABSTRACT

A linear recliner is described for controllably adjusting the angular position of a seatback relative to a seat member in response to actuation by a seat occupant. The linear seat recliner includes a rod adapted to be operatively connected to one of the seatback and the seat member and a housing pivotably connected to the other of the seatback and the seat member. The housing is configured to receive a portion of the rod for linear movement relative thereto whereby linear movement of the recliner rod corresponds to angular movement of the seatback relative to the seat member. The linear seat recliner further includes a cam plate coupled for rotation with an actuator shaft and which is adapted to engage a toothed pawl so as to move the pawl to and from engagement with the toothed portion of the recliner rod, thereby establishing locked and released modes for the linear seat recliner. In one embodiment, substantially similar slave and master latch mechanisms are provided with the master latch mechanism connected to a release mechanism operable to shift both latch mechanisms from their latched conditions.

15 Claims, 5 Drawing Sheets

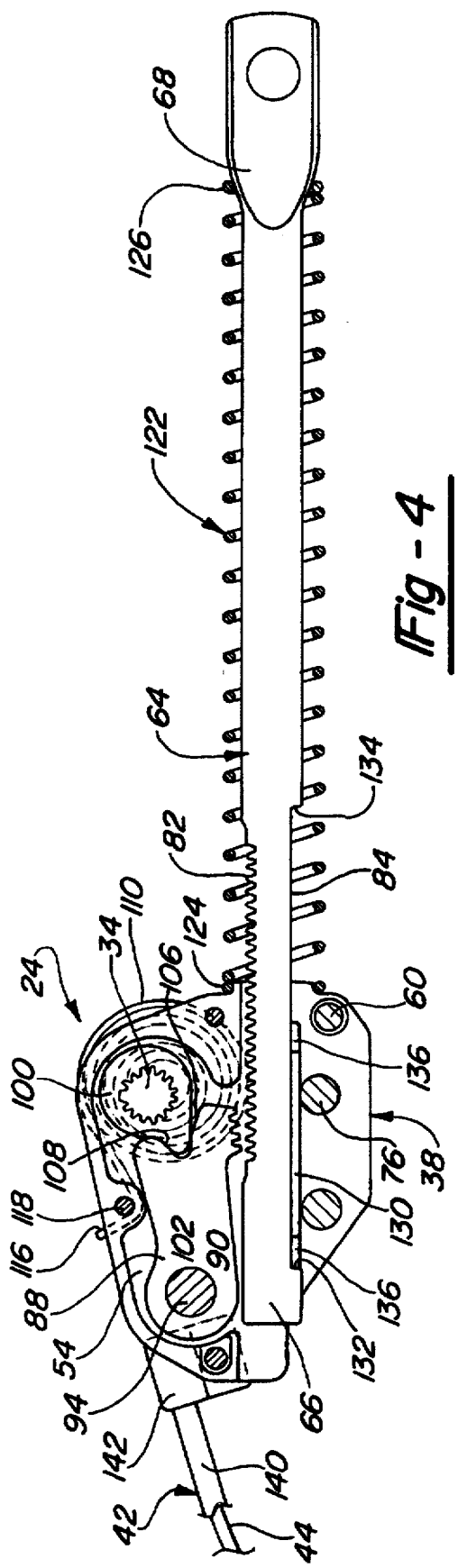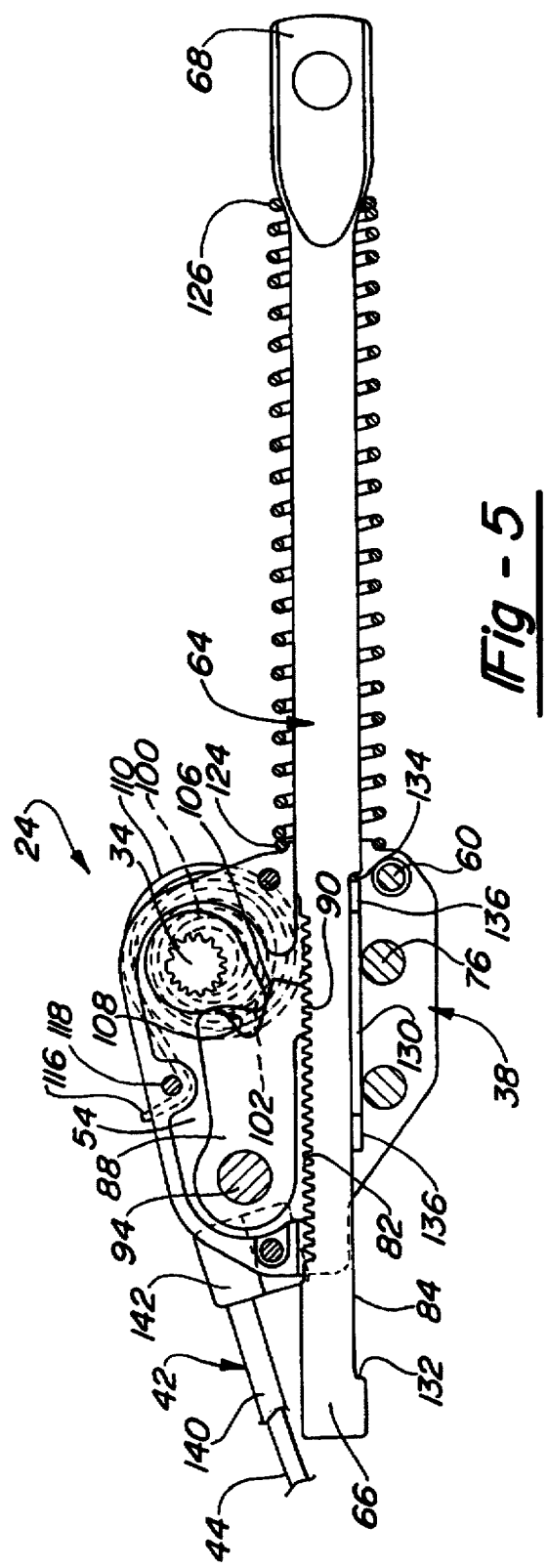

SIMPLIFIED LINEAR RECLINER

BACKGROUND OF THE INVENTION

This invention relates to linear seat recliners that are operable for angularly reclining the seatback of a vehicle seat into a desired position relative to the seat cushion.

It is commonly desirable to install reclinable seat assemblies in motor vehicles in view of the enhanced comfort and convenience they provide. Such reclinable seat assemblies typically include a seat recliner that can be selectively actuated for adjusting the angular position of the seatback relative to the seat cushion. Traditionally, seat recliners include a pivot mechanism interconnecting the seatback to the seat cushion and a latch mechanism for releasably latching the pivot mechanism. The general arrangement and operation of such a reclinable seat assembly equipped with a linear seat recliner is illustrated by U.S. Pat. No. 4,898,424 and U.S. Pat. No. 5,052,752, each commonly assigned to the assignee of this application and each expressly incorporated herein by reference.

Seat recliners are most commonly of a type utilizing frictional engagement or incremental engagement ("meshing") for releasably latching the seatback in a desired reclined position. In the latter category, many such seat recliners include a latch mechanism having a pawl that vertically reciprocates between a locked position whereat the angular position of the seatback relative to the seat member is established and a retracted position whereat the angular position of the seatback is adjustable by the seat occupant. However, existing seat recliners, particularly those of the incrementally engageable or meshed category, typically require a complicated arrangement of latch elements to generate the locking engagement of the seatback. Thus, a need exists for development of a seat recliner latch mechanism having a simplified yet efficient arrangement for incrementally engaging a recliner rod to establish the angular position of the seatback relative to the seat cushion.

A known shortcoming associated with incrementally engageable latch mechanisms is that they are often the source of undesirable differential movement of the seatback relative to the seat member, commonly referred to as "chucking". Generally, the seat recliner is pivotably connected to the seatback and the seat frame at a first pivot point while the seatback itself is pivotably connected to the seat cushion or the seat frame at a second pivot point. As such, the seatback creates an extremely long lever arm upon which forces are applied, thereby creating various other forces that act upon the pivotable connections of the seatback and the seat recliner itself. These forces, when coupled with "play" between the engaging teeth and tolerances between the components, may cause the seatback to move or "chuck" even when the seat recliner is in its locked position. Movement within and between the seat recliner elements is magnified by the length of the seatback, and generally become noticeable at the upper end of the seat. For example, the seatback of an occupied vehicle seat may tend to oscillate when the vehicle encounters rough road conditions.

One technique that has been employed to reduce chucking is to form the components of the pivot mechanism with exceedingly close tolerances. In other words, the corresponding teeth, as well as the pivot bearings for the rotating components, must be manufactured with very high precision. This technique reduces play in the pivot mechanism and thus reduces chucking. However, manufacturing to such close tolerances is expensive, and such close tolerances may bind the components of the system and prevent smooth operation. Thus, a need also exists for a seat recliner latch mechanism that reduces chucking without requiring exceedingly close tolerances.

SUMMARY OF THE INVENTION

It is an object of the present invention to provide a simplified linear seat recliner having a latch mechanism that is selectively operable for establishing the angular position of a seatback relative to a seat cushion.

An addition object of the present invention is to provide a linear seat recliner that reduces chucking, operates smoothly without binding and without requiring excessively close tolerances.

Accordingly, the novel linear seat recliner disclosed herein includes a housing configured to receive a recliner rod for bi-directional linear movement relative thereto and a latch mechanism having a lock pawl supported within the housing for pivotal movement between an unlatched position whereat the recliner rod is movable for adjusting the angular position of the seatback relative to the seat member and a latched position whereat locking teeth on the lock pawl engage a toothed portion of the recliner rod for lockingly establishing the angular position of the seatback relative to the seat member. The lock pawl is urged into its latched position by a spring-biased cam plate, thereby limiting the play between the locking teeth on the lock pawl and the teeth on the recliner rod.

BRIEF DESCRIPTION OF THE DRAWINGS

FIG. 4 is a partial sectional view of the master latch mechanism in its latched position with the seatback in its fully reclined position;

FIG. 5 is a partial sectional view of the master latch mechanism in its released position with the seatback in its fully upright position.

DETAILED DESCRIPTION OF THE PREFERRED EMBODIMENT

Figure 1:
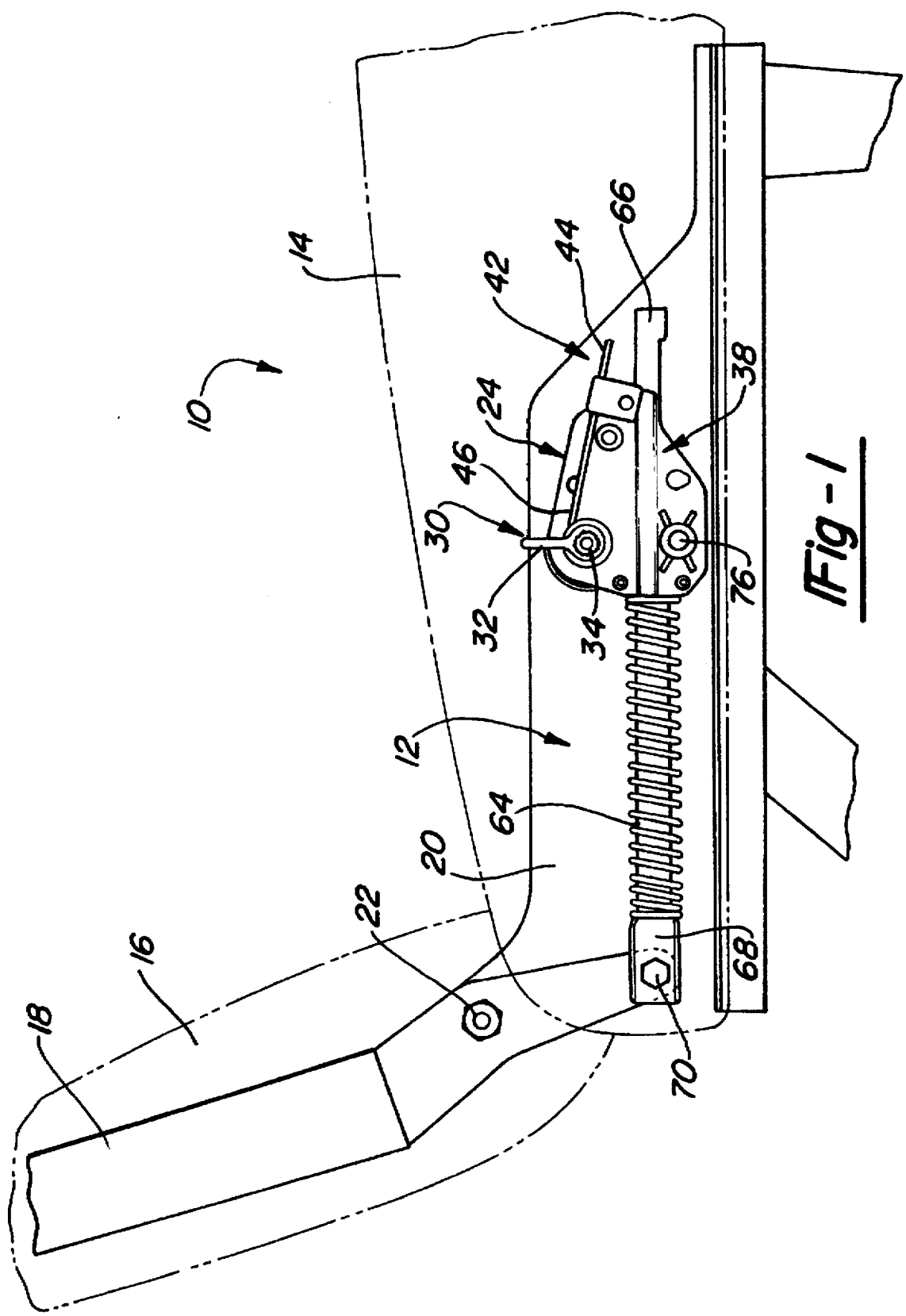
FIG. 1 is a side elevational view of a seat assembly according to a presently preferred embodiment of the present invention illustrating the operational association between a linear seat recliner and a common seat structure.

Referring now to FIG. 1 of the drawings, a seat assembly 10 incorporating an adjustable linear seat recliner 12 according to a presently preferred embodiment of the present invention is shown. More specifically, FIG. 1 illustrates a seat assembly 10 that provides a predetermined range of angular movement between a seat cushion 14 and a seatback 16. To this end, seat recliner 12 functionally interconnects seat cushion 14 and seatback 16 to permit the inclined angle therebetween to be controllably varied. Seatback 16 includes a pair of lateral frame rails 18 (only one shown) that are each coupled to an adjacent lateral frame segment 20 of seat cushion 14 for pivotable movement about a hinge pin 22. Seatback frame rails 18 and seat frame segments 20 are typically fabricated of a relatively rigid material and are suitably configured to provide stable pivotal motion upon actuation of linear seat recliner 12.

Figure 2:
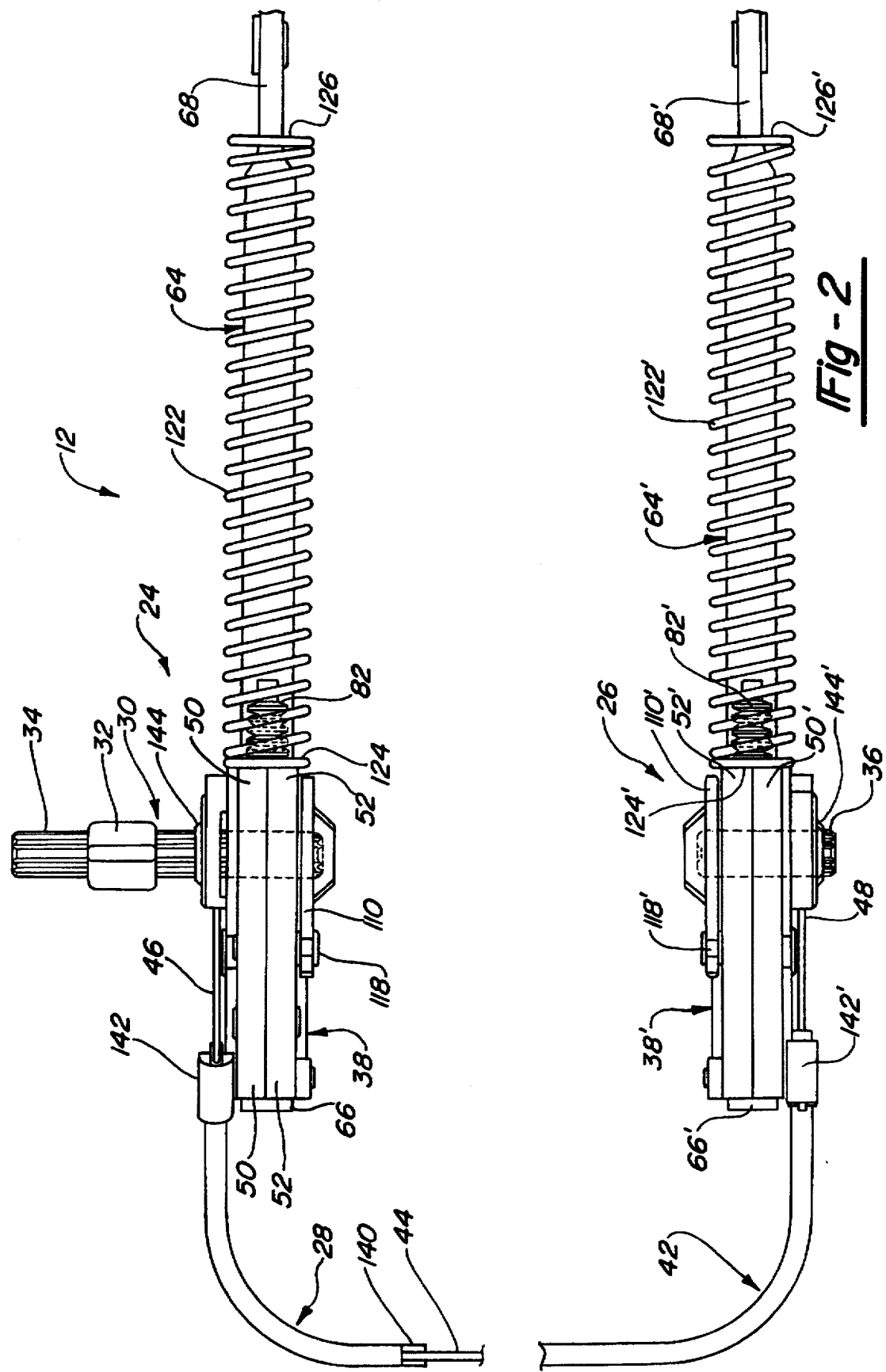
FIG. 2 is a top plan view of the linear seat recliner which includes a manually-operable "master" latch mechanism and a "slave" latch mechanism that are operatively interconnected for synchronously controlling the inclination of the seatback relative to the seat member shown in FIG. 1.

With particular reference to FIG. 2, it is contemplated that seat recliner 12 include both a first or "master" latch mechanism 24 and a second or "slave" latch mechanism 26 that are interconnected by a coupling mechanism 28 for common actuation by manual operation of a release mechanism 30. As described in greater detail hereinafter, release mechanism 30 includes a release handle 32 mounted to an actuator shaft 34 of master latch mechanism 24. Coupling mechanism 28 functions to operatively couple actuator shaft 34 to an actuator shaft 36 of slave latch mechanism 26. Actuator shafts 34 and 36 are supported for rotation within master and slave housing assemblies 38 and 38', respectively, and operable to selectively and synchronously shift master latch mechanism 24 and slave recliner mechanism 26 from a "locked" mode to a "released" mode, thereby allowing a seat occupant to adjust the angular position of seatback 16 relative to seat cushion 14. Those skilled in the art will appreciate that the structure of slave latch mechanism 26 is substantially similar to that of master latch mechanism 24 except that release handle 32 of release mechanism 30 is fixedly coupled (i.e., splined) to actuator shaft 34 of master latch mechanism 24. Preferably, coupling mechanism 28 includes a cable assembly 42 having an inner cable 44 with its first end 46 connected to master actuator shaft 34 and its second end 48 connected to slave actuator shaft 36. While a dual (i.e., master slave) latching arrangement is disclosed, it should also be appreciated that in some seating applications only a single releasable latch mechanism may be needed.

With particular reference now to FIGS. 2 through 5, housing assembly 38 of master latch mechanisms 24 is shown to generally include a first housing portion 50 and a second housing portion 52 connectable to form a cavity 54 accommodating the operative components of the present invention. Specifically, first and second housing portions 50 and 52 respectively include alignable sets of apertures 56 and 58 that are cooperative with screws 60 or other suitable fasteners to secure first and second housing portions 50 and 52 to one another. Housing assembly 38 also includes a longitudinal, generally cylindrical bore 62 adapted to accommodate an elongated recliner rod 64 having a first end 66 adapted to be supported within housing assembly 38 and a second end 68 adapted to be mounted to a lower distal end of frame rail 18 as by fasteners 70. A pair of alignable bores 72 and 74 pass through first and second housing portions 50 and 52 and cooperates with fastener 76 (FIG. 1) to pivotably connect master latch mechanism 24 to frame support 20 associated with seat cushion 14, thereby permitting master latch mechanism 24 to pivot relative thereto upon reciprocable movement of elongated recliner rod 64. In this manner, linear movement of recliner rod 64 relative to housing assembly 38 through a limited range of axial motion defines a corresponding range of angular movement of seatback 16 relative to seat cushion 14. Housing assembly 38 also includes another pair of alignable bores 78 and 80 adapted to journally accommodate externally-splined actuator shaft 34 for rotation therewithin as hereinafter discussed.

Figure 3:
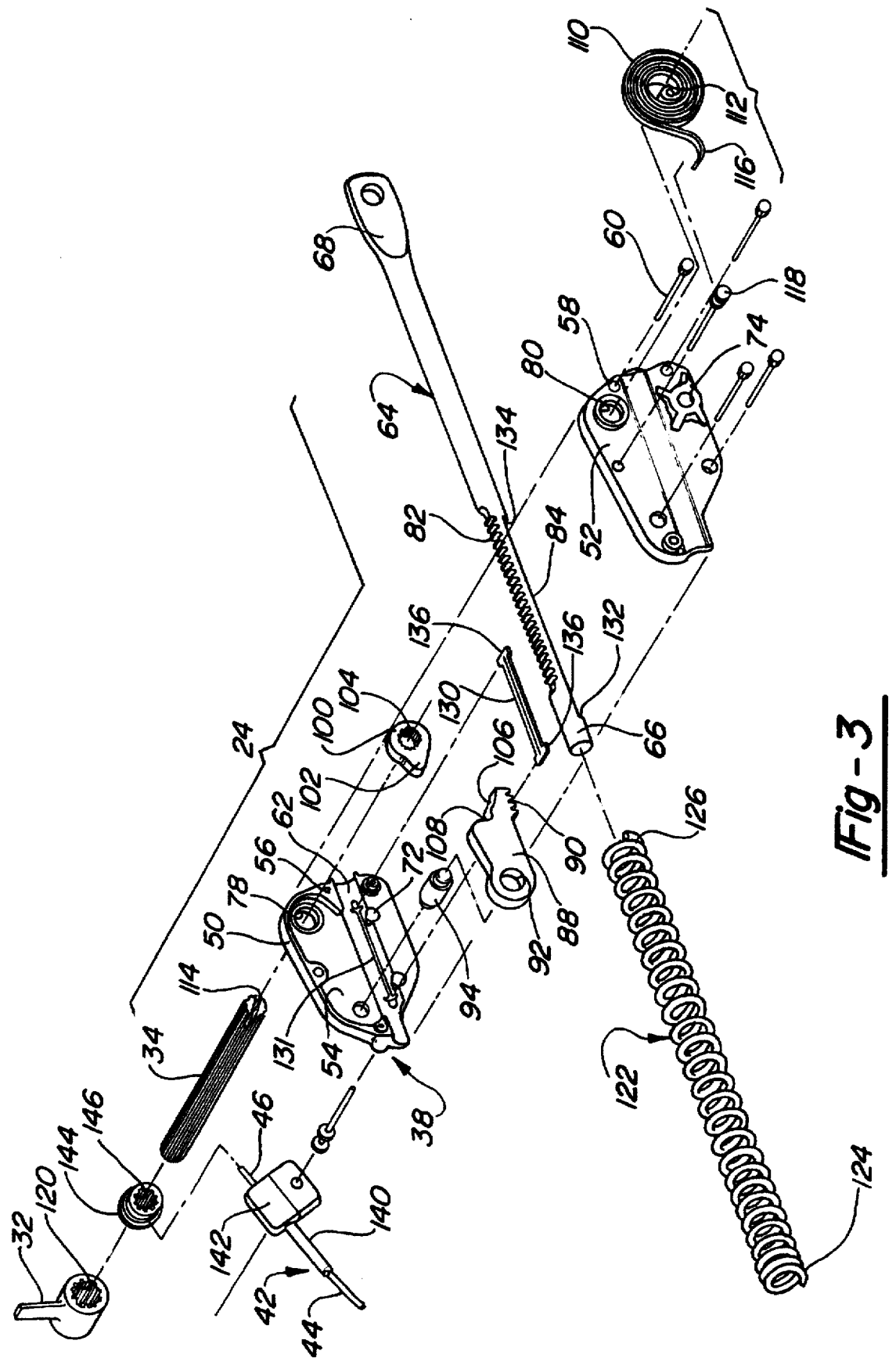
FIG. 3 is an exploded perspective view of the master latch mechanism shown in FIG. 2.

As best seen in FIG. 3, a toothed rack 82 is provided on the upper portion of elongated recliner rod 64 proximate to first end 66 thereof while a non-toothed section 84 is located opposite to toothed rack 82. Master latch mechanism 24 further include a lock pawl 88 having teeth 90 and an aperture 92 through which lock pawl 88 is pivotably connected between housing portions 50 and 52 of housing assembly 38 by a pin 94. Teeth 90 are adapted to engage toothed rack 82 on elongated recliner rod 64 when master latch mechanism 24 is in its locked mode, as is hereinafter described.

Master latch mechanism 24 includes a cam plate 100 having a camming tab 102 and an internally-splined aperture 104 that is adapted to mesh with externally-splined actuator shaft 34 for common rotational movement therewith relative to housing assembly 38. Cam plate 100 and lock pawl 88 are supported within cavity 54 of housing assembly 38 such that camming tab 102 of cam plate 100 cooperates with one of a first cam surface 106 and a second cam surface 108 formed on lock pawl 88 to rotate lock pawl 80 to and from a latched position (FIG. 4) from and to an unlatched position (FIG. 5). A biasing mechanism, such as a spiral spring 110, is provided to normally urge lock pawl 88 toward its latched position. In the preferred embodiment, spiral spring 110 includes a first end 112 retained in a slot 114 formed in one end of actuator shaft 34 and a second end 116 retained on a stop pin 118 extending from housing assembly 38. Spiral spring 110 is operable for normally biasing actuator shaft 34 to rotate in a first direction (i.e., counterclockwise in FIGS. 4 and 5) for urging camming projection 102 into engagement with first cam surface 106 of lock pawl 88, thereby normally biasing lock pawl 88 to rotate in a first direction (i.e., clockwise in FIGS. 4 and 5) for forcing teeth 90 into locked engagement with toothed rack 82. To this end, FIG. 4 illustrates lock pawl 88 in its latched position whereat its teeth 90 lockingly engage toothed rack 82 on recliner rod 64 for establishing the locked mode for master latch mechanism 24, thereby preventing linear reciprocable movement of recliner rod 64 relative to housing assembly 38.

Release mechanism 30 is provided to allow a seat occupant to rotate actuator shaft 34 in a second direction (i.e., clockwise in FIGS. 4 and 5), in opposition to the biasing force exerted thereon by spiral spring 110, for lifting lock pawl 88 to its unlatched position whereat its teeth 90 are disengaged from toothed rack 82 on recliner rod 64 for establishing the released mode for latch mechanism 24, thereby permitting movement of recliner rod 64. As seen, release handle 32 has an internally-splined boss 120 meshingly received on externally-splined actuator shaft 34. Thus, release handle 32 is fixed for rotation with actuator shaft 34 of master latch mechanism 24. Handle 32 is located in close proximity to a lateral edge of seat assembly 10 to permit a seat occupant to selectively shift latch mechanism 24 from its normal locked mode into its released mode in response to rotation of actuator shaft 32 in its second direction. In operation, rotation of handle 32 in the second direction results in concurrent rotation of cam plate 100 such that camming projection 102 is forcibly moved into engagement with second cam surface 108 of lock pawl 88. Such action causes lock pawl 88 to rotate about pin 94 to its unlatched position shown in FIG. 5 whereat its teeth 90 are displaced from toothed rack 82 on recliner rod 64. Thereafter, rearward pressure exerted on seatback 16 by the seat occupant causes seatback 16 to pivot about hinge pins 22 for reclining seatback 16. Reclining movement of seatback 16 results in forward linear movement of recliner rod 64 relative to housing assembly 38. To assist in returning seatback 16 toward its upright position from any rearwardly reclined position, seat recliner 12 is further provided with a second biasing mechanism, such as coil spring 122, surrounding recliner rod 64 and having a first end 124 acting against housing assembly 38 and a second end 126 acting against second end 68 of recliner rod 64. Coil spring 122 is preloaded to cause rearward linear movement of recliner rod 64 relative to housing assembly 38 which, in turn, causes seatback 16 to pivot about hinge pins 22 toward its upright position. As will be appreciated, linear movement, either forward or rearward, is inhibited unless master latch mechanism 24 is in its released mode due to manual operation of release handle 32.

Master latch mechanism 24 is further provided with means for limiting the range of angular movement of seatback 16, thereby defining the fully upright and reclined positions. Accordingly, a stop plate 130 is disposed in an approximately sized chamber 131 within housing cavity 54 for cooperation with non-toothed lower section 84 of recliner rod 64. As best seen in FIGS. 4 and 5, lower section 84 defines a forward stop shoulder 132 and a rearward stop shoulder 134. FIG. 5 illustrates master latch mechanism 24 in its released mode with seatback 16 in its fully upright position such that forward stop shoulder 132 contacts the end of stop plate 130. Similarly, FIG. 4 shows master latch mechanism 24 in its locked mode with seatback 16 in its fully reclined position such that rearward shoulder 134 contacts the opposite end of stop plate 130. Transverse tabs 136 formed on opposite ends of stop plate 130 are provided to nest within corresponding apertures in housing portions 50 and 52 to prevent sliding movement of stop plate 130 within housing assembly 38. As seen in FIG. 4, movement of seatback 16 to its fully reclined position results in forward movement of recliner rod 64 which compresses coil spring 122. Once the occupant removes pressure from seatback 16, coil spring 122 forcibly drives rod 64 rearwardly for moving seatback 16 to its upright position.

Figure 6:
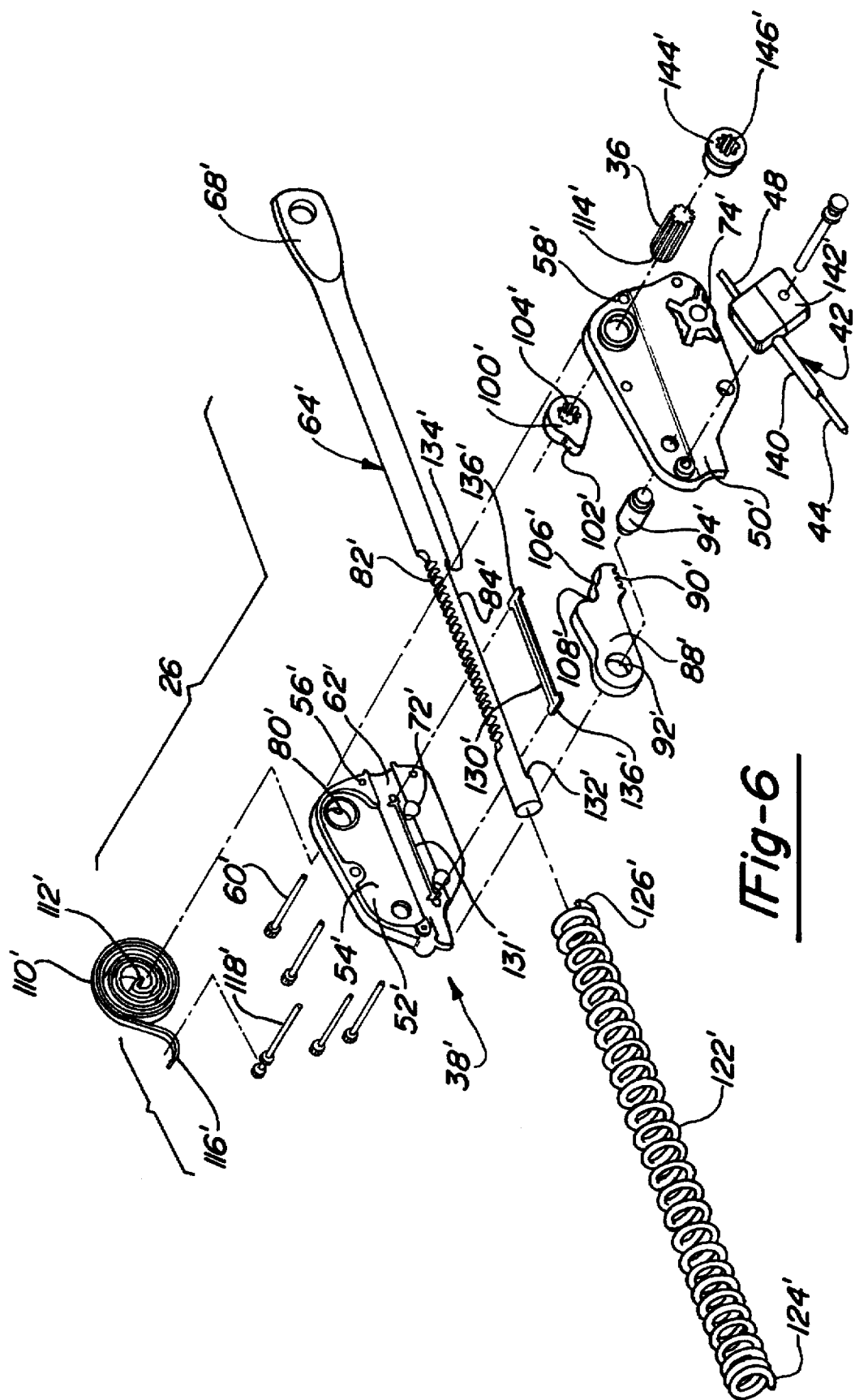
FIG. 6 is an exploded perspective view of the slave latch mechanism shown in FIG. 2.

FIG. 6 is an exploded view of slave latch mechanism 26 which illustrates its substantial similarity in componentry and function to that of master latch mechanism 24. As such, like components are identified with primed reference numerals.

As noted, coupling mechanism 28 interconnects actuator shaft 36 of slave latch mechanism 26 to actuator shaft 34 of master slave mechanism 24 such that actuation of release handle 32 causes concurrent and synchronous shifting of slave latch mechanism 26 from its locked mode into its released mode in response to shifting of master latch mechanism 24 from its locked mode into its released mode. Spiral springs 110 and 110' are arranged to normal biasing actuator shafts 34 and 36 in a direction to forcibly urge cam plates 100 and 100' to engage lock pawls 88 and 88' for movement toward their respective latched positions. In particular, cable assembly 42 includes a sheathing 140 enclosing inner cable 44 and mounting brackets 142 and 142' for mounting opposite ends of sheathing 140 to housings 38 and 38', respectively. First end 46 of cable 44 extends outwardly from bracket 142 and is fixed to actuator shaft 34 via a locking collar 144. Specifically, first end 46 of inner cable 44 is rigidly secured to locking collar 144 which has an internally-splined portion 146 adapted to meshingly engage the external splines on actuator shaft 34. Similarly, second end 48 of inner cable 44 extends outwardly from bracket 142' and is fixed to actuator shaft 36 via another locking collar 144' that is similarly fixed to actuator shaft 36. In operation, rotation of release handle 32 in the second direction (opposing spiral spring 110) acts to pull on inner cable 44. Such action causes actuator shaft 36 to thus rotate in concert with rotation of actuator shaft 34 for concurrently shifting both latch mechanisms into their released modes.

Turning now to the anti-chuck feature of the present invention, current manufacturing techniques, as previously mentioned, are generally unable to eliminate tolerances that create play in the seat recliner mechanism. In the present invention, not only does the biasing force of spring 110 minimize chucking by taking up the play between pawl teeth 90 and toothed rack 82 on recliner rod 64, but the geometric interrelation between lock pawl 88, cam plate 100 and recliner rod 64 further eliminates this problem. Specifically and as best seen in FIG. 4, lock pawl 88 and cam plate 100 are arranged within housing assembly 38 such that a pawl pivot point defined by the axis of pawl pivot pin 94, the cam plate pivot point defined by the axis of actuator shaft 34 and the pivot axis of housing assembly 38 defined by fastener 76 substantially form the vertices of an equilateral triangle. It will be appreciated by those skilled in the art that such an arrangement equalizes the forces acting thereon, thereby taking up the clearances at the engagement points and eliminating seatback chucking.

Various other advantages and modifications will become apparent to one skilled in the art after having the benefit of studying the teachings of the specification, the drawings and the following claims.

What is claimed is:

1. A seat recliner mechanism for controllably adjusting the position of an angularly adjustable seatback relative to a seat member, said mechanism being responsive to actuation by a seat occupant, comprising:

a recliner rod having a first end and a second end, said first end having a rack of teeth, said second end connectable to one of said seat member and seatback;

a housing connectable to the other of said seat member and said seatback and configured to receive said first end of said recliner rod for linear movement relative thereto;

a pawl having a toothed segment and first and second cam surfaces, said pawl supported from said housing for pivotable movement about a pivot point between a first position whereat said toothed segment of said pawl engages said rack of teeth of said recliner rod thereby preventing linear movement of said recliner rod relative to said housing and a second position wherein said toothed segment of said pawl is disengaged from said rack of teeth of said recliner rod whereby said rod is linearly moveable relative to said housing;

an actuator shaft supported from said housing for rotation relative thereto;

a cam plate fixed for rotation with said actuator shaft and having a camming tab arranged to engage one of said first and second cam surfaces on said pawl;

a release operator fixed to said actuator shaft, said operator movable in a first direction for rotating said actuator shaft and said cam plate such that said camming tab engages said first cam surface on said pawl for forcibly moving said pawl from said first position to said second position;

a biasing mechanism for normally biasing said cam plate such that said camming tab engages said second cam surface on said pawl such that said pawl is normally biased toward said first position.

2. The seat recliner mechanism of claim 1 further including a second biasing mechanism acting between said recliner rod and said housing for urging said seatback to an upright position when said pawl is in said second position.

3. The seat recliner mechanism of claim 1 wherein said first biasing mechanism is a spiral spring having a first end connected to said housing and a second end connected to said cam plate so as to normally urge said cam plate camming tab into contact with said second cam surface of said pawl.

4. The seat recliner mechanism of claim 1 further including motion limiting means for limiting the range of linear movement of said recliner rod relative to said housing thereby defining a corresponding range of angular movement of said seatback relative to said seat member.

5. The seat recliner mechanism of claim 4 wherein said motion limiting means includes a flat portion formed on said recliner rod at said first end and a stop plate cooperatively disposed within said housing, said flat portion defining a first stop shoulder face and a second stop shoulder, said stop plate having a first end and a second end, said first end of said stop plate abutting said first stop shoulder when said seatback is in its fully reclined position and said second end of said stop plate abutting said second stop shoulder when said seatback is in its fully upright position.

6. A seat recliner mechanism for controllably adjusting the position of an angularly adjustable seatback relative to a seat member, said mechanism being responsive to actuation by a seat occupant, comprising:

a recliner rod having a first end and a second end, said first end having a length of teeth along its top surface, said second end connectable to one of said seat member and seatback;

a housing connectable to the other of said seat member and said seatback and configured to receive a portion of said recliner rod for linear movement relative thereto;

a pawl having a first camming surface, a second camming surface and a tooth, said pawl connected to said housing for pivotable movement about a pawl pivot point between a first position wherein said pawl tooth engages said length of teeth of said recliner rod thereby preventing linear movement of said recliner rod relative to said housing and a second position wherein said pawl tooth is disengaged from said length of teeth of said recliner rod whereby said recliner rod is linearly moveable relative to said housing;

a camming member coupled to said housing for pivotable movement between a locking position wherein said camming member contacts said first camming surface of said pawl at a contact point thereby placing said pawl into said first position and a released position wherein said camming member cooperates with said second camming surface of said pawl to place said pawl into said second position;

first biasing means associated with said camming member for urging said camming member into said locking position; and release means coupled to said camming member for moving said camming member from said locking position to said released position thereby moving said pawl into said second position to permit the seat occupant to adjust the reclining angle of said seatback relative to said seat member.

7. The seat recliner mechanism of claim 6 further comprising a splined actuating rod and wherein said camming member includes a splined aperture cooperative with said splined actuating rod such that said camming member is coupled for rotation with said splined actuating rod, said splined actuating rod having a longitudinal axis defining said pawl pivot point.

8. The seat recliner mechanism of claim 7 wherein said release means is coupled to said splined actuating rod.

9. The seat recliner mechanism of claim 8 wherein said release means includes a handle connected for rotation to said splined actuating rod.

10. The seat recliner mechanism of claim 6 further comprising motion limiting means for limiting the range of axial movement of said recliner rod relative to said housing so as to define a corresponding range of angular movement of said seatback relative to said seat member.

11. The seat recliner mechanism of claim 10 wherein said motion limiting means includes a flat portion formed on said recliner rod substantially opposite said length of teeth and a stop plate cooperatively disposed within said housing, said flat portion defining a first engagement face and a second engagement face, said stop plate having a first end and a second end, said first end of said stop plate abutting said first engagement face when said seatback is fully reclined, said second end of said stop plate abutting said second engagement face when said seatback is in its fully upright position.

12. A seat assembly comprising:

a seat member;

a seatback;

pivot means for permitting pivotal movement of said seatback relative to said seat member between a reclined position and an upright position;

a recliner rod having a first end and a second end, said first end having a length of teeth, said second end connectable to one of said seat member and seatback;

a housing connectable to the other of said seat member and said seatback and configured to receive a portion of said recliner rod for linear movement relative thereto;

a pawl having a tooth, said pawl connected to said housing for pivotable movement about a pawl pivot point between a first position wherein said pawl tooth engages said length of teeth of said recliner rod thereby preventing linear movement of said recliner rod relative to said housing and a second position wherein said pawl tooth is disengaged from said length of teeth of said recliner rod whereby said rod is linearly moveable relative to said housing;

a camming member pivotably coupled to said housing by a splined actuating rod and moveable between a first position and a second position, said camming member cooperating with said pawl to move said pawl from and to said first position to and from said second position when said camming member is moved from and to said first position to and from said second position;

first biasing means coupled to said housing and one of said pawl and said camming member for urging said pawl into said first position;

releasing means coupled to said housing for rotating said pawl from said first position to said second position; and second biasing means associated with said recliner rod for urging said seatback into said upright position.

13. The seat assembly of claim 12 wherein said pawl further includes a first camming surface and a second camming surface, said camming member cooperating with said first camming surface to urge said pawl into said first position when said camming member is urged into said first position, said camming member cooperating with said second camming surface to urge said pawl into said second position when said camming member is urged into said second position, and wherein said first biasing means is coupled to said camming member to urge said camming member into said first position.

14. In a seat assembly having a seatback pivotably connected to a seat member and a seat recliner mechanism for controlling the angular position of the seatback relative to the seat member, said seat recliner mechanism comprising:

a master recliner mechanism including a recliner rod, housing, pawl, camming member and first biasing means, said recliner rod having a first end with a length of teeth and a second end connectable to one of said seat member and seatback, said housing connectable to the other of said seat member and said seatback and configured to receive a portion of said recliner rod for linear movement relative thereto, said pawl having a tooth and connected to said housing for pivotable movement about a pawl pivot point between a first position wherein said pawl tooth engages said length of teeth of said recliner rod thereby preventing linear movement of said recliner rod relative to said housing and a second position wherein said pawl tooth is disengaged from said length of teeth of said recliner rod whereby said rod is linearly moveable relative to said housing, said camming member pivotably coupled to said housing and moveable between a first position and a second position, said camming member cooperating with said pawl to move said pawl from and to said first position to and from said second position when said camming member is moved from and to said first position to and from said second position, said first biasing means coupled to said housing and one of said pawl and said camming member for urging said pawl into said first position;

a slave recliner mechanism including a recliner rod, housing, pawl, camming member and first biasing means, said recliner rod having a first end with a length of teeth and a second end connectable to one of said seat member and seatback, said housing connectable to the other of said seat member and said seatback and configured to receive a portion of said recliner rod for linear movement relative thereto, said pawl having a tooth and connected to said housing for pivotable movement about a pawl pivot point between a first position wherein said pawl tooth engages said length of teeth of said recliner rod thereby preventing linear movement of said recliner rod relative to said housing and a second position wherein said pawl tooth is disengaged from said length of teeth of said recliner rod whereby said rod is linearly moveable relative to said housing, said camming member pivotably coupled to said housing and moveable between a first position and a second position, said camming member cooperating with said pawl to move said pawl from and to said first position to and from said second position when said camming member is moved from and to said first position to and from said second position, said first biasing means coupled to said housing and one of said pawl and said camming member for urging said pawl into said first position;

releasing means interconnecting said master recliner mechanism and said slave recliner mechanism, said releasing means operable by a seat occupant for substantially simultaneously rotating said pawls of said master recliner mechanism and said slave recliner mechanism from said first positions to said second positions whereby the angular position of the seatback and the seat member is variable; and second biasing means associated with said recliner rod of at least one of said master recliner mechanism and slave recliner mechanism for urging said seatback into said upright position.

15. The seat assembly of claim 14 wherein said camming member of said master recliner mechanism is coupled to said master mechanism housing by a splined actuating rod rotatable within said master mechanism housing, wherein said camming member of said slave recliner mechanism is coupled to said slave mechanism housing by a splined actuating rod rotatable within said slave mechanism housing, and wherein said release means include a release cable having a first end coupled to said splined actuating rod of said master recliner mechanism and a second end coupled to said splined actuating rod of said slave recliner mechanism whereby actuation of said release means rotates said master and slave camming members.

* * * * *